US012034764B1

United States Patent
Roundy et al.

(10) Patent No.: US 12,034,764 B1
(45) Date of Patent: Jul. 9, 2024

(54) SYSTEMS AND METHODS FOR DETECTING MALWARE BASED ON ANOMALOUS CROSS-CUSTOMER FINANCIAL TRANSACTIONS

(71) Applicant: GEN DIGITAL INC., Tempe, AZ (US)

(72) Inventors: Kevin Roundy, El Segundo, CA (US); Daniel Kats, Culver City, CA (US)

(73) Assignee: GEN DIGITAL INC., Tempe, AZ (US)

( * ) Notice: Subject to any disclaimer, the term of this patent is extended or adjusted under 35 U.S.C. 154(b) by 878 days.

(21) Appl. No.: 17/083,874

(22) Filed: Oct. 29, 2020

(51) Int. Cl.
*H04L 9/40* (2022.01)
*G06N 20/00* (2019.01)
*G06Q 30/018* (2023.01)
*G06Q 30/0204* (2023.01)
*G06Q 40/00* (2023.01)
*G06Q 40/02* (2023.01)

(52) U.S. Cl.
CPC ........... *H04L 63/145* (2013.01); *G06N 20/00* (2019.01); *G06Q 30/0185* (2013.01); *G06Q 30/0204* (2013.01); *G06Q 40/00* (2013.01); *G06Q 40/02* (2013.01); *H04L 63/1416* (2013.01); *H04L 63/1425* (2013.01)

(58) Field of Classification Search
CPC .................................................. H04L 63/145
See application file for complete search history.

(56) References Cited

U.S. PATENT DOCUMENTS

| | | | |
|---|---|---|---|
| 9,690,938 B1* | 6/2017 | Saxe | G06N 3/045 |
| 10,009,358 B1* | 6/2018 | Xie | G06F 21/552 |
| 10,552,274 B1* | 2/2020 | Zhao | G06F 11/2082 |
| 2019/0180029 A1* | 6/2019 | Copty | G06F 21/56 |

(Continued)

OTHER PUBLICATIONS

Julisch, Klaus, "Clustering Intrusion Detection Alarms to SupportRoot Cause Analysis", URL: https://citeseerx.ist.psu.edu/viewdoc/download?doi=10.1.1.3.3177&rep=rep1&type=pdf, ACM Journal Name, vol. 2, No. 3, Sep. 2002, pp. 111-138.

(Continued)

*Primary Examiner* — Simon P Kanaan
(74) *Attorney, Agent, or Firm* — Greenberg Traurig, LLP

(57) ABSTRACT

The disclosed computer-implemented method for detecting malware based on anomalous cross-customer financial transactions may include (i) detecting, using a machine-learning algorithm, a set of anomalies associated with fraudulent financial transactions for source user accounts in a group of customer financial accounts, (ii) identifying, based on customer transaction metadata associated with a group of target user accounts in the customer financial accounts, a cluster of financial transactions having anomaly instances in common with the set of anomalies, (iii) linking each of the customer financial accounts having the common anomaly instances in the cluster of financial transactions with a corresponding customer threat protection account to discover a user device identification, (iv) determining that artifacts appearing on a group of user devices are associated with a potential malware attack, and (v) performing a security action that protects against the potential malware attack. Various other methods, systems, and computer-readable media are also disclosed.

20 Claims, 7 Drawing Sheets

(56) References Cited

U.S. PATENT DOCUMENTS

2021/0209512 A1* 7/2021 Gaddam ............. H04L 63/1408
2022/0084371 A1* 3/2022 Semichev ............... H04L 63/08

OTHER PUBLICATIONS

Ounacer et al., "Using Isolation Forest in anomaly detection: the case of credit card transactions", URL: https://pdfs.semanticscholar.org/4013/bb59a49ceb4679cdf407e0b53c274026868e.pdf, Periodicals of Engineering and Natural Sciences, vol. 6, No. 2, Dec. 2018, pp. 394-400.
Malkov et al., "Efficient and robust approximate nearest neighbor search using Hierarchical Navigable Small World graphs", URL: https://arxiv.org/abs/1603.09320, IEEE Transactions on Journal Name, Manuscript ID, Mar. 2016, pp. 1-13.
Chauhan, Nagesh Singh, "DBSCAN Clustering Algorithm in Machine Learning", URL: https://www.kdnuggets.com/2020/04/dbscan-clustering-algorithm-machine-learning.html, KDnuggets, Apr. 2020, 13 pages.
Fan et. al., "AdaCost: Misclassification Cost-sensitive Boosting", URL: https://pdfs.semanticscholar.org/9ddf/bc2cc5c1b13b80a1a487b9caa57e80edd863.pdf, May 1999, 9 pages.
Ankur, "Locality Sensitive Hashing with Cosine Similarity", URL: https://conceptfreak.com/hashing-using-cosine-similarity/, Nov. 14, 2018, 3 pages.

* cited by examiner

SYSTEMS AND METHODS FOR DETECTING MALWARE BASED ON ANOMALOUS CROSS-CUSTOMER FINANCIAL TRANSACTIONS

BACKGROUND

Security software for monitoring consumer and enterprise financial accounts is often utilized by computing device users to detect potential threats that may result in financial damages or losses. For example, a conventional security software solution may monitor and review the use of customer account data from a number of financial institutions to identify threats, such as suspicious account activity (e.g., identity theft), that may often be caused by malicious actors and then flag any associated unusual or high-risk activity (e.g., opening new accounts, changing existing accounts, unauthorized high value currency transfers, etc.) for subsequent communication to affected customers.

However, many security threats (such as Banking Trojan malware, ransomware, fake technical support scams, and fake infected computing device scams, etc.) utilized in malicious attack campaigns targeting customer financial accounts often evade detection by conventional security software. As a result, these malicious attack campaigns may potentially result in significant monetary losses for financial account customers.

SUMMARY

As will be described in greater detail below, the present disclosure describes various systems and methods for detecting malware based on anomalous cross-customer financial transactions.

In one example, a method for detecting malware based on anomalous cross-customer financial transactions may include (i) detecting, using a machine-learning algorithm executing on one or more computing devices, a set of anomalies associated with fraudulent financial transactions for one or more source user accounts (e.g., a group of source user accounts) in a group of customer financial accounts (ii) identifying, by the one or more computing devices and based on customer transaction metadata associated with a group of target user accounts in the customer financial accounts, a cluster of financial transactions having anomaly instances in common with the set of anomalies for the source user accounts, (iii) linking, by the one or more computing devices, each of the customer financial accounts having the common anomaly instances in the cluster of financial transactions with a corresponding customer threat protection account to discover a user device identification for the customer threat protection account, (iv) determining, by the one or more computing devices and utilizing the user device identification, that one or more artifacts appearing on a group of user devices are associated with a potential malware attack, and (v) performing, by the one or more computing devices, a security action that protects against the potential malware attack.

In some examples, the set of anomalies associated with fraudulent financial transactions may be detected by (i) monitoring, utilizing an unsupervised anomaly detection algorithm, one or more financial transactions involving the source user accounts, and (ii) identifying one more or more attributes associated with financial fraud in the financial transactions involving the source user accounts as the set of anomalies associated with fraudulent financial transactions. In some embodiments, the attributes associated with financial fraud may include a monetary value associated with the financial transactions involving the source user accounts and/or a financial asset type associated with known fraudulent financial transactions.

In some examples, the cluster of financial transactions having anomaly instances in common with the set of anomalies for the source user accounts may be identified by (i) examining the customer transaction metadata to characterize any anomalies in financial transactions associated with the group of target user accounts occurring within a predetermined time period and (ii) using an approximate nearest neighbor search algorithm to identify, from among the anomalies in the financial transactions associated with the target user accounts, the anomaly instances in common with the set of anomalies for the source user accounts. In some embodiments, the customer transaction metadata may include a customer user identification, customer account data, merchant data, transaction amount data, and/or timestamp data. In some embodiments, the approximate nearest neighbor search algorithm may include a locality sensitive hashing (LSH) algorithm or a hierarchical navigable small worlds (HSNW) algorithm.

In some examples, the artifacts appearing on the group of user devices that are associated with a potential malware attack may be determined by (i) collecting the artifacts from the user devices, and (ii) identifying suspicious artifact instances in the collected artifacts as being associated with the potential malware attack. In some embodiments, the suspicious artifact instances may be identified by (i) identifying identical artifact instances on each of the user devices, and (ii) identifying non-identical artifact instances on each of the user devices. In some embodiments, the identical artifact instances may include files, visited domains, uniform resource locators (URLs), registry load-point entries, scripts, and/or event logs. In some embodiments, the non-identical artifact instances may include similar files, similar visited domains, similar URLs, similar registry load-point entries, similar scripts, and/or similar event logs.

In some examples, the security action that protects against the potential malware attack may include adding the artifacts associated with the potential malware attack to a blacklist. Additionally or alternatively, the security action may include generating an alert for the user devices associated with the potential malware attack. Additionally or alternatively, the security action may include notifying a financial institution associated with the user devices of the potential malware attack.

In one embodiment, a system for detecting malware based on anomalous cross-customer financial transactions may include at least one physical processor and physical memory that includes computer-executable instructions and a group of modules that, when executed by the physical processor, cause the physical processor to (i) detect by a detection module using a machine-learning algorithm, a set of anomalies associated with fraudulent financial transactions for one or more source user accounts (e.g., a group of source user accounts) in a group of customer financial accounts, (ii) identify, by an identification module, based on customer transaction metadata associated with a group of target user accounts in the customer financial accounts, a cluster of financial transactions having anomaly instances in common with the set of anomalies for the source user accounts, (iii) link, by a linking module, each of the customer financial accounts having the common anomaly instances in the cluster of financial transactions with a corresponding customer threat protection account to discover a user device identification for the customer threat protection account, (iv) determine, by a determining module utilizing the user device identification, that one or more artifacts appearing on a group of user devices are associated with a potential malware attack, and (v) perform, by a security module, a security action that protects against the potential malware attack.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, using a machine-learning algorithm executing on the computing device, a set of anomalies associated with fraudulent financial transactions for one or more source user accounts (e.g., a group of source user accounts) in a group of customer financial accounts, (ii) identify, based on customer transaction metadata associated with a group of target user accounts in the customer financial accounts, a cluster of financial transactions having anomaly instances in common with the set of anomalies for the source user accounts, (iii) link each of the customer financial accounts having the common anomaly instances in the cluster of financial transactions with a corresponding customer threat protection account to discover a user device identification for the customer threat protection account, (iv) determine, utilizing the user device identification, that one or more artifacts appearing on a group of user devices are associated with a potential malware attack, and (v) perform a security action that protects against the potential malware attack.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
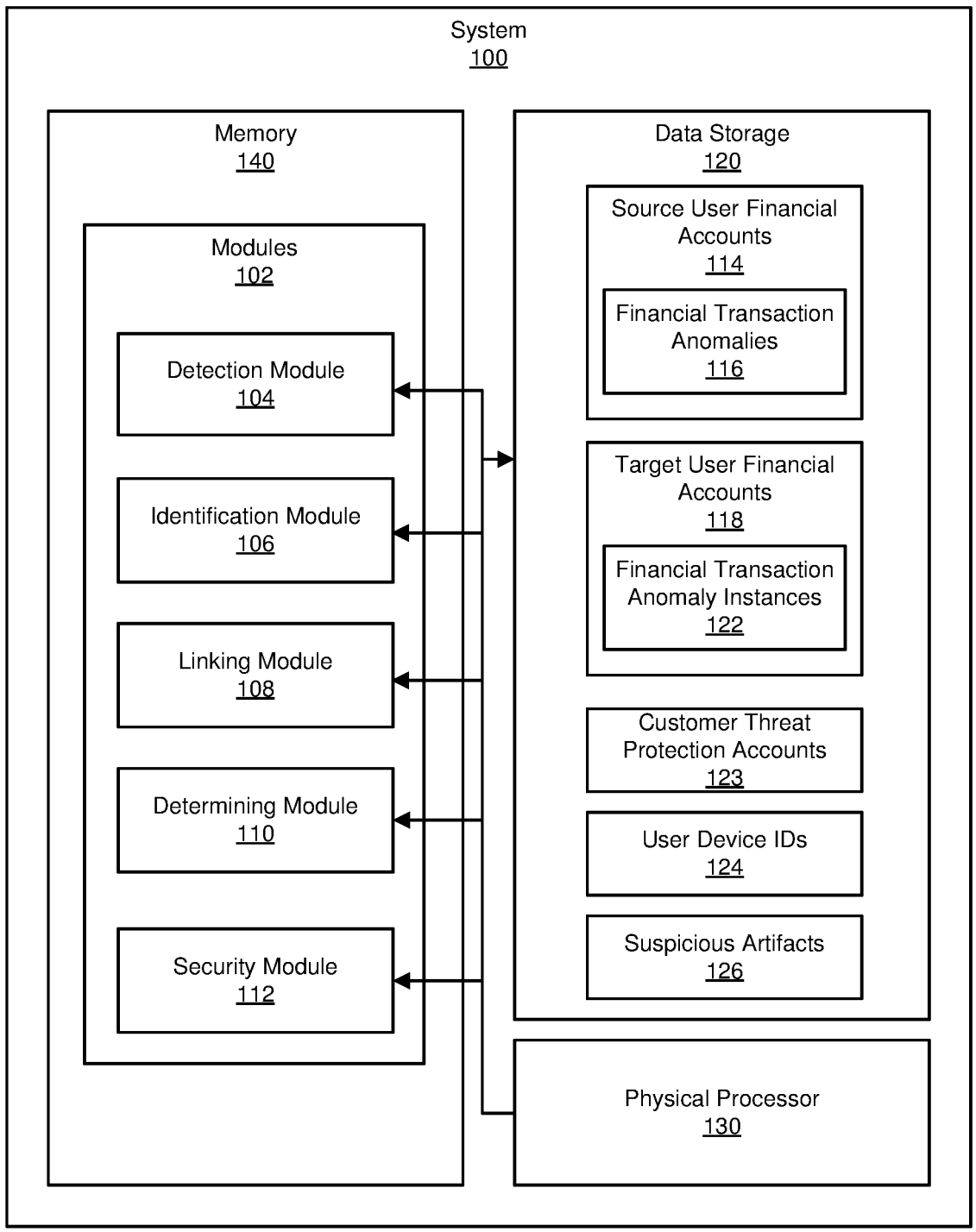
FIG. 1 is a block diagram of an example system for detecting malware based on anomalous cross-customer financial transactions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting malware based on anomalous cross-customer financial transactions. As will be described in greater detail below, the systems and methods described herein may detect financial anomalies (e.g., cryptocurrency transactions associated with ransomware payments and Banking Trojan activity) among groups of financial account customers experiencing similar financial losses from these anomalies. The systems and methods described herein may then link the affected customer financial accounts with corresponding customer threat protection accounts to identify machine (i.e., computing device) identifiers for each customer and then inputting these machine identifiers into a threat detector which collects and identifies artifacts utilized by threat actors (e.g., software files, visited domains, URLs, registry entries for load points, scripts, and event log patterns) that are disproportionately likely to appear on a cluster of the machines (as compared to other machine clusters) as potential malware. By utilizing the aforementioned anomaly and threat detection techniques in this way, the systems and methods described herein may identify and protect users from potentially harmful malware attack campaigns targeting customer financial accounts and further prevent or reduce financial losses resulting from these campaigns.

In addition, the systems and methods described herein may improve the field of financial account fraud by detecting anomalies in online financial transactions conducted by customers that result in financial losses. Moreover, the systems and methods described herein may improve the field of computing device security by preventing malware designed to cause damage to a computing device based on threats detected during customer financial transactions.

Figure 2:
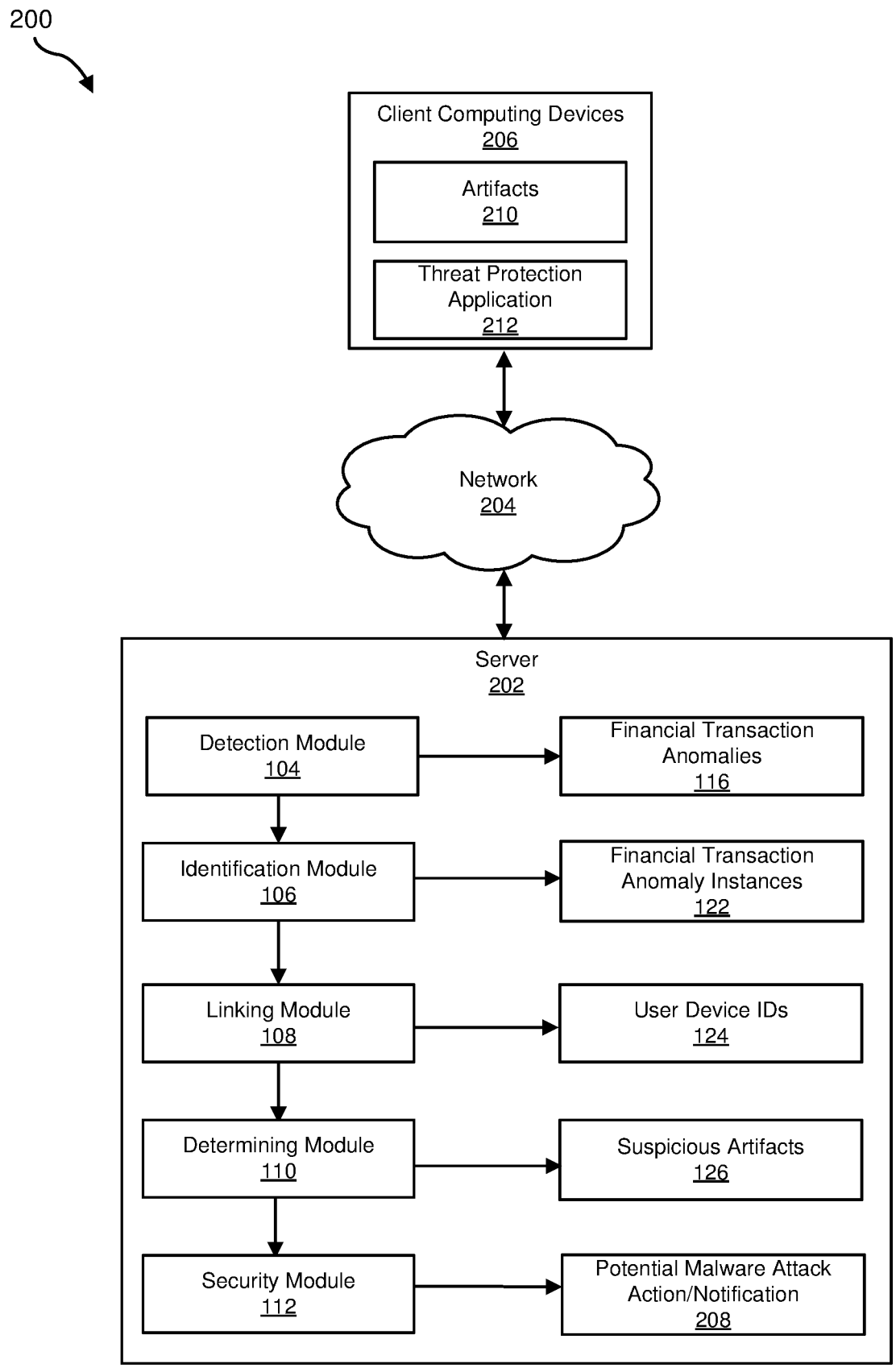
FIG. 2 is a block diagram of an additional example system for detecting malware based on anomalous cross-customer financial transactions.
Figure 4:
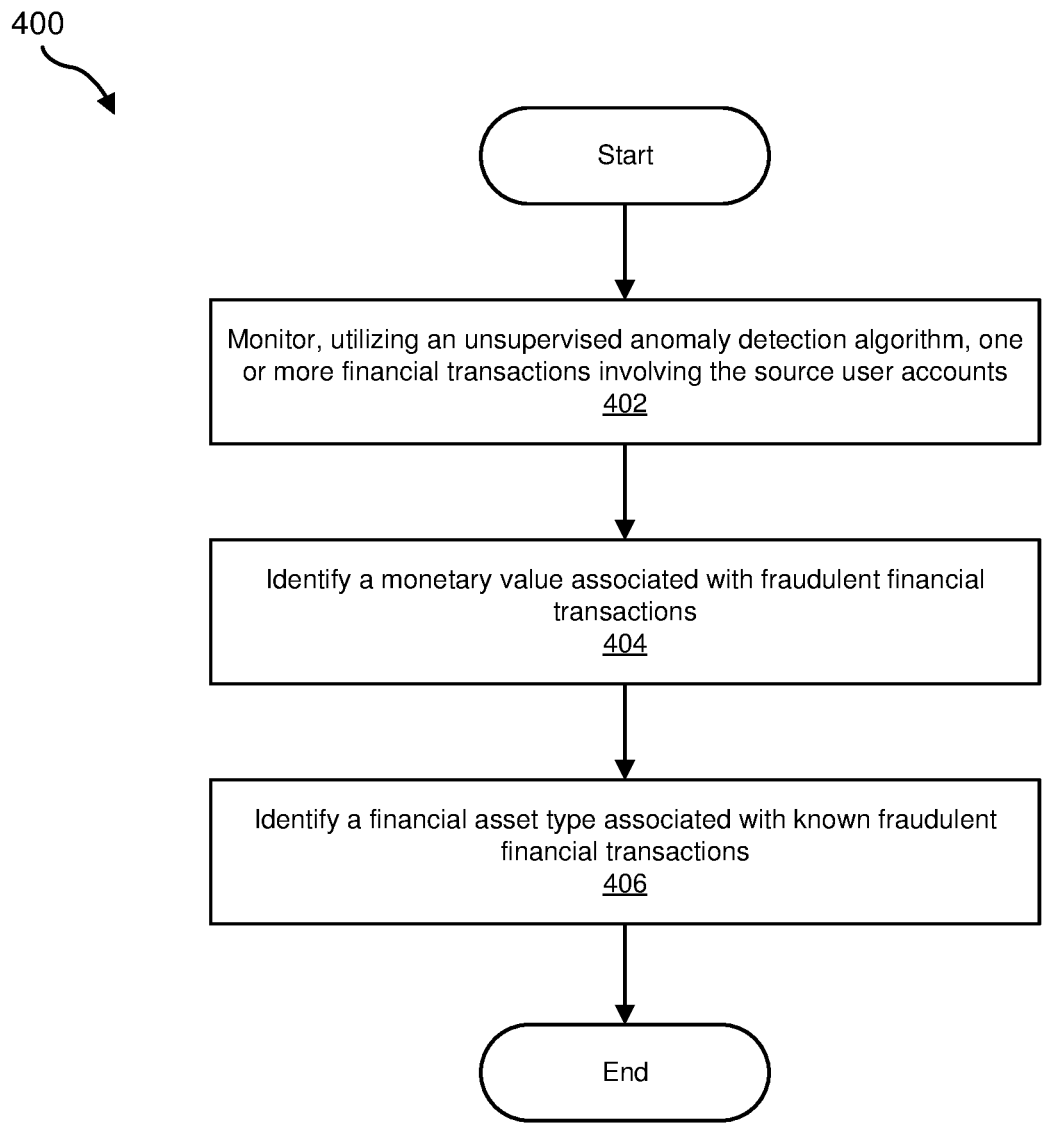
FIG. 4 is a flow diagram of another example method for detecting malware based on anomalous cross-customer financial transactions.
Figure 5:
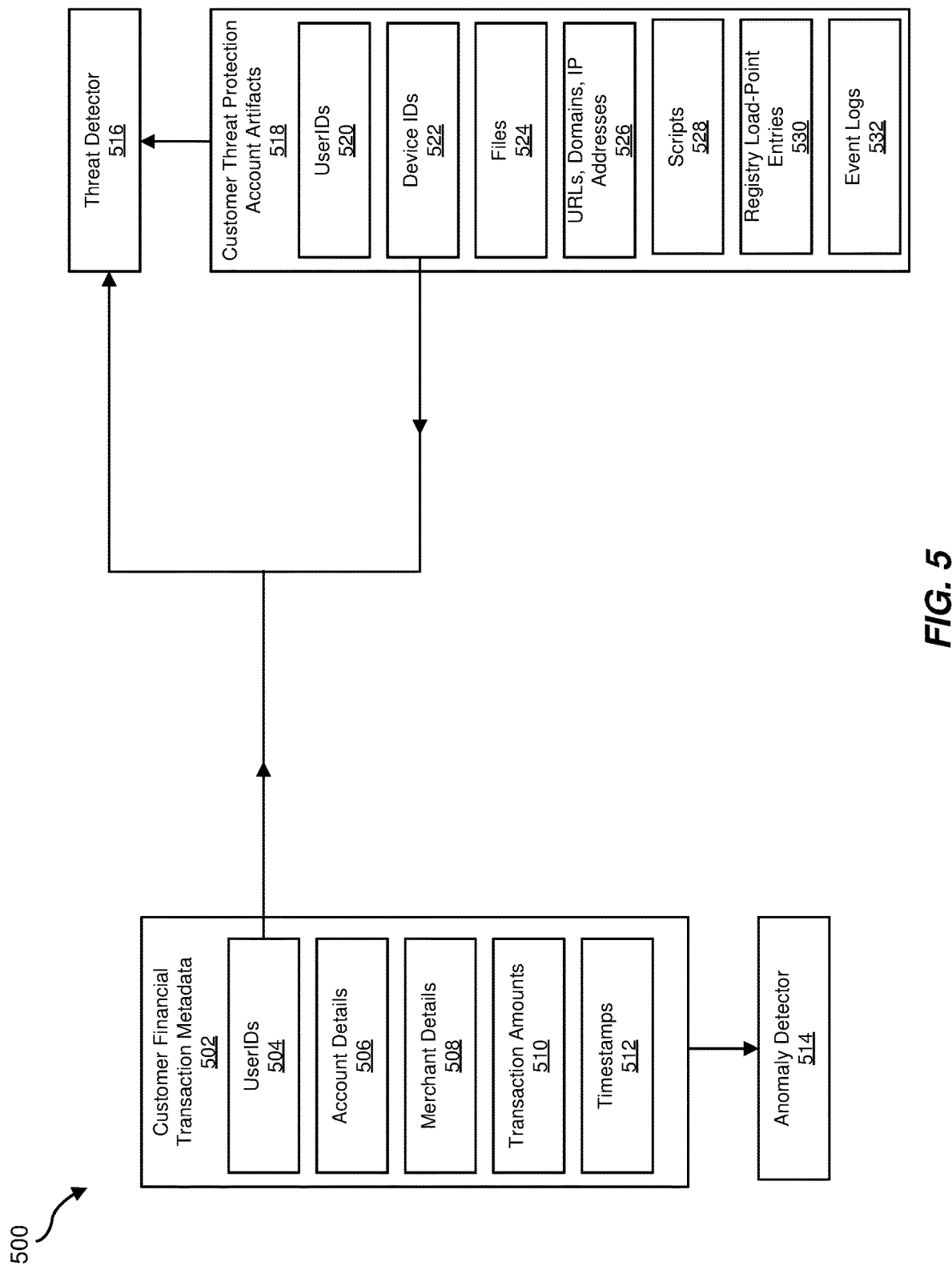
FIG. 5 is a block diagram of an additional example system for detecting malware based on anomalous cross-customer financial transactions.

The following will provide, with reference to FIGS. 1-2 and 5, detailed descriptions of example systems for detecting malware based on anomalous cross-customer financial transactions. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting malware based on anomalous cross-customer financial transactions. As illustrated in this figure, example system 100 may include one or more modules 102 for performing one or more tasks. For example, and as will be explained in greater detail below, example system 100 may include a detection module 104 that detects, using a machine-learning algorithm, a set of anomalies (e.g., financial transaction anomalies 116) associated with fraudulent financial transactions for source user financial accounts 114 in a group of customer financial accounts. Example system 100 may additionally include an identification module 106 that identifies, based on customer transaction metadata associated with a group of target user accounts (e.g., target user financial accounts 118) in the customer financial accounts, a cluster of financial transaction having anomaly instances (e.g., financial transaction anomaly instances 122) in common with the set of anomalies for source user financial accounts 114. Example system 100 may also include a linking module 108 that links each of the customer financial accounts having the common anomaly instances in the cluster of financial transactions with corresponding customer threat protection accounts 123 to discover user device identifications (e.g., a user device IDs 124). Example system 100 may additionally include a determining module 110 that determines, utilizing user device IDs 124, that one or more artifacts (e.g., suspicious artifacts 126) appearing on a group of user devices are associated with a potential malware attack. Example system 100 may also include a security module 110 that performs a security action that protects against the potential malware attack. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., server 202 and/or client computing devices 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting against misleading clicks on websites. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store, on system 100, data associated with source user financial accounts 114 (including financial transaction anomalies 116), target user financial accounts 118 (including financial transaction anomaly instances 122), user device IDs 124, and suspicious artifacts 126.

Example system 100 in FIG. 1 may be implemented in a variety of ways. For example, all or a portion of example system 100 may represent portions of example system 200 in FIG. 2. As shown in FIG. 2, system 200 may include a server 202 in communication with client computing devices 206 via a network 204. In one example, all or a portion of the functionality of modules 102 may be performed by server 202, client computing devices 206, and/or any other suitable computing system. As will be described in greater detail below, one or more of modules 102 from FIG. 1 may, when executed by at least one processor of server 202 and/or client computing devices 206, enable server 202 and/or client computing devices 206 to detect malware based on anomalous cross-customer financial transactions.

For example, detection module 104 may detect financial transaction anomalies 116 utilizing a machine-learning algorithm. Next, identification module 106 may identify financial transaction anomaly instances 122 that are in common (e.g., similar) to financial transaction anomalies 116 based on customer transaction metadata associated with target user financial accounts 118. Then, linking module 108 may link customer financial accounts (i.e., source user financial accounts 114 and target user financial accounts 118) having common financial transaction anomaly instances 122 with corresponding customer threat protection accounts 123 to discover user device IDs 124 for client computing devices 206. Next, determining module 110 may determine, utilizing user device IDs 124, that one or more artifacts 210 appearing on client computing devices 206 are associated with a potential malware attack (i.e., suspicious artifacts 126). Finally, security module 112 may perform a security action that protects against the potential malware attack by generating a potential malware attack action/notification 208 for client computing devices 206 utilizing threat protection application 212.

Server 202 generally represents any type or form of computing device that is capable of reading and/or executing computer-readable instructions. In some examples, server 202 may be a security server providing cloud-based anomaly monitoring and threat detection services for financial institution customers having accounts for conducting financial transactions. Additional examples of server 202 include, without limitation, application servers, web servers, storage servers, and/or database servers configured to run certain software applications and/or provide various security, web, storage, and/or database services. Although illustrated as a single entity in FIG. 2, server 202 may include and/or represent a plurality of servers that work and/or operate in conjunction with one another.

Client computing devices 206 generally represent any type or form of computing device capable of reading computer-executable instructions. In some examples, client computing devices 206 may be endpoint devices running client-side security software for preventing and responding to security threats (e.g., malware). Additional examples of client computing devices 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internetof-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between server 202 and client computing devices 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
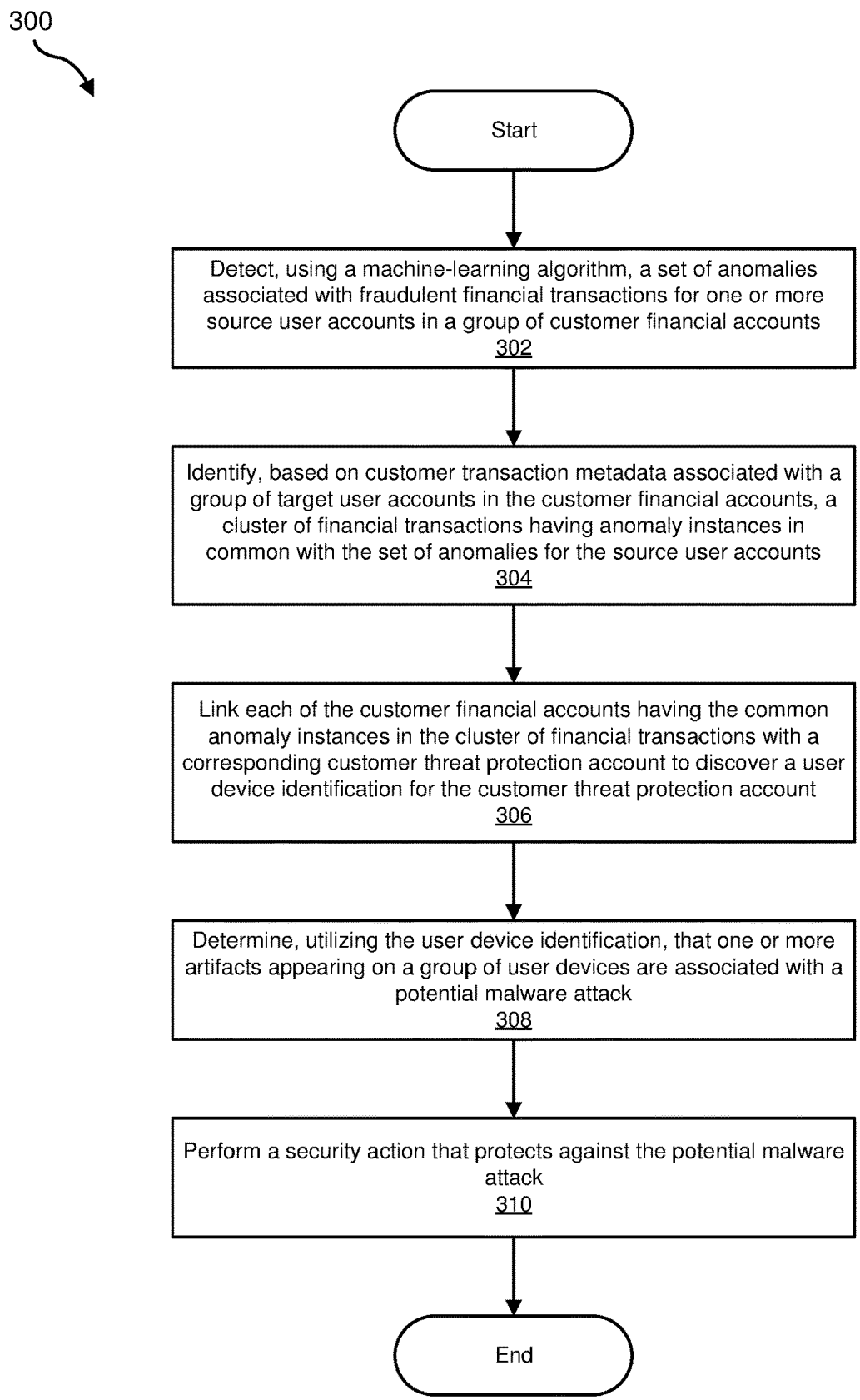
FIG. 3 is a flow diagram of an example method for detecting malware based on anomalous cross-customer financial transactions.

FIG. 3 is a flow diagram of an example computer-implemented method 300 for detecting malware based on anomalous cross-customer financial transactions. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect, using a machine-learning algorithm, a set of anomalies associated with fraudulent financial transactions for one or more source user accounts (e.g., a group of source user accounts) in a group of customer financial accounts. For example, detection module 104 may, as part of server 202 in FIG. 2, detect, using a machine learning algorithm, financial transaction anomalies 116 associated with fraudulent transactions for source user financial accounts 114. In some examples, the machine-learning algorithm used by detection module 104 may be an unsupervised anomaly detection algorithm (e.g., the Isolation Forest algorithm) in combination with a boosting algorithm (e.g., AdaCost). The use of these machine-learning algorithms by detection module 104 will be described in greater detail below in the description of FIG. 4.

The term "financial transaction anomalies," as used herein, generally refers to any unusual or abnormal pattern of financial institution transactions (e.g., single customer transactions for source user financial accounts 114) for a customer. In some examples, financial transaction anomalies may include first-time purchases of cryptocurrency for the purpose of engaging in fraudulent transactions causing financial losses, such as making ransomware payments to decrypt inaccessible files on a customer's computing device. In other examples, financial transaction anomalies may include unusual or abnormal account activity associated with attacks by Banking Trojan malware (e.g., Dridex or Ursnif) such as the activation of macros (e.g., from opening an email attachment) written to inject code on a customer's computing device for carrying out fraudulent transactions causing financial losses, such as stealing customer credentials for engaging in banking theft.

The term "source user financial accounts" (or "source user accounts"), as used herein, generally refers to any financial services account (or group of financial services accounts) with one or more financial institutions for carrying out online transactions on computing devices associated with a customer or customer group. These transactions may include, without limitation, the purchase of merchant goods and/or services and currency transfers.

Detection module 104 may detect financial transaction anomalies 116 in a variety of ways which will now be described in conjunction with FIG. 4. FIG. 4 is a flow diagram of an example computer-implemented method 400 for detecting malware based on anomalous cross-customer financial transactions. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may monitor, utilizing an unsupervised anomaly detection algorithm, one or more financial transactions involving the source user accounts. For example, detection module 104 may, as part of server 202 in FIG. 2, monitor, utilize an unsupervised anomaly detection algorithm, one or more financial transactions involving source user financial accounts 114. As briefly discussed above in the description step 302 of FIG. 3, the unsupervised anomaly detection algorithm may include the Isolation Forest machine learning algorithm in combination with a boosting algorithm (e.g., AdaCost).

Detection module 104 may monitor the one or more financial transactions in a variety of ways. In some examples, detection module 104 may monitor financial transactions for source user financial accounts 114 with the Isolation Forest algorithm while using the AdaCost boosting algorithm to prioritize the detection of fraudulent transactions based on a predefined monetary value (e.g., fraudulent transactions having a high monetary value) and a financial asset type (e.g., transactions with properties known to be associated with fraud such as cryptocurrency).

At step 404 one or more of the systems described herein may identify a monetary value associated with fraudulent financial transactions following the monitoring performed at step 402. For example, detection module 104 may, as part of server 202 in FIG. 2, identify a monetary value associated with financial transactions monitored for source user financial accounts 114.

Detection module 104 may identify the monetary value associated with fraudulent financial transactions for source user financial accounts 114 in a variety of ways. In some examples, detection module 104 may identify the monetary value based on predetermined criteria such as fraudulent transactions typically have a high monetary value relative to other transactions involving source user financial accounts 114.

At step 406 one or more of the systems described herein may identify a financial asset type associated with known fraudulent financial transactions following the monitoring performed at step 402 and the monetary value identification performed at step 404. For example, detection module 104 may, as part of server 202 in FIG. 2, identify a financial asset type involving source user financial accounts 114 that is associated with known fraudulent financial transactions.

Detection module 104 may identify the financial asset type associated with known fraudulent financial transactions in a variety of ways. For example, detection module 104 may identify cryptocurrency (which is known to be associated with fraudulent financial transactions) being utilized in transactions involving source user financial accounts 114.

Returning now to FIG. 3, at step 304 one or more of the systems described herein may identify, based on customer transaction metadata associated with a group of target user accounts in the customer financial accounts, a cluster of financial transactions having anomaly instances in common with the set of anomalies for the source user accounts. For example, identification module 106 may, as part of server 202 in FIG. 2, may identify, based on customer transaction metadata associated with target user financial accounts 118, a cluster of financial transactions having financial transaction anomaly instances 122 in common (e.g., similar) with financial transaction anomalies 116 for source user financial accounts 114.

The term "target user financial accounts" (or "target user accounts"), as used herein, generally refers to any cluster of financial services accounts for carrying out online transactions on one or more computing devices associated with customers. These transactions may include, without limitation, the purchase of merchant goods and/or services and currency transfers.

The term "customer transaction metadata," as used herein, generally refers to information describing transactions occurring in a customer financial account (e.g., source user financial accounts 114 and target user financial accounts 118) occurring within a predetermined period (e.g., 24 hours) of each other. In some examples, customer transaction metadata may include, without limitation, a customer user ID, customer account data, merchant data, transaction amount data, and timestamp data.

The term "financial transaction anomaly instances," as used herein, generally refers to any instances of unusual or abnormal financial institution transactions for one or more groups of financial account customers. In some examples, these financial institution transactions, which may be the same or similar for each of a group of financial account customers, may include, without limitation, the purchase of merchant goods and/or services and currency transfers.

Identification module 106 may identify, based on the customer transaction metadata, the cluster of financial transactions having financial transaction anomaly instances 122 in common with financial transaction anomalies 116, in a variety of ways. For example, identification module 106 may examine the customer transaction metadata to characterize any of financial transaction anomalies instances 122 occurring within a predetermined time period (e.g., a 24 hour period) and then utilize an approximate nearest neighbor search algorithm to identify any financial transaction anomaly instances 122 in common with (e.g., similar to) financial transaction anomalies 116. As discussed above, the customer transaction metadata may include customer user IDs, customer account data, merchant data, transaction amount data, and timestamp data. In some examples, the approximate nearest neighbor search algorithm may be a locality sensitive hashing (LSH) algorithm with Cosine Similarity or, alternatively, a hierarchical navigable small worlds (HNSW) algorithm plus density-based spatial clustering of applications with noise (DBScan).

At step 306 one or more of the systems described herein may link each of the customer financial accounts having the common anomaly instances in the cluster of financial transactions with a corresponding customer threat protection account to discover a user device identification for the customer threat protection account. For example, linking module 108 may, as part of server 202 in FIG. 2, link source user financial accounts 114 and target user financial accounts 118 having common financial transaction anomaly instances 122 with customer threat protection accounts 123 to discover user device IDs 124.

Linking module 108 may link common financial transaction anomaly instances 122 with customer threat protection accounts 123 to discover user device IDs 124 in a variety of ways. In some examples, linking module 108 may link each customer financial account (e.g., source user financial accounts 114 and target user financial accounts 118) to a corresponding customer threat protection account 123 to identify all registered machine identifiers (i.e., user device IDs). Linking module 108 may then input the resulting sets of machine identifiers into determining module 110 (for device threat detection) as will be described in greater detail below.

At step 308 one or more of the systems described herein may determine, utilizing the user device IDs discovered at step 306, that one or more artifacts appearing on a group of user devices are associated with a potential malware attack. For example, determining module 110 may, as part of server 202 in FIG. 2, determine, utilizing user device IDs 124, that one or more artifacts 210 appearing on client computing devices 206 are associated with a potential malware attack.

The term "artifacts," as used herein, generally refers to any resources and data that may be stored on and/or utilized by a computing device. In some examples, artifacts may include, without limitation, computer files, visited domains, URLs, registry load-point entries, scripts, and event logs (e.g., WINDOWS operating system event logs).

Determining module 110 may utilize user device IDs 124 to determine artifacts 210 that are associated with a potential malware attack (i.e., suspicious artifacts 126) in a variety of ways. In some examples, determining module 110 may collect artifacts 210 from client computing devices 206 and then identify any suspicious artifacts 126 found in artifacts 210 as being associated with a potential malware attack. In one embodiment, determining module 110 may identify suspicious artifacts 126 by identifying identical instances of artifacts 210 (e.g., identical files, identical domains visited, identical URLs, identical registry load-point entries, identical scripts, and/or identical event logs) appearing on each of client computing devices 206. For example, determining module 110 may identify any identical instances of artifacts 210 as disproportionately likely to appear on infected computing devices (i.e., a cluster computing devices) as compared to other computing devices. Additionally or alternatively, determining module 110 may identify suspicious artifacts 126 by identifying non-identical (e.g., similar) instances of artifacts 210 (e.g., similar files, similar domains visited, similar URLs, similar registry load-point entries, similar scripts, and/or similar event logs) appearing on each of client computing devices 206. For example, for computing device software files, determining module 110 may identify suspicious artifacts 126 from among non-identical instances of artifacts 210 by identifying a cluster of uncertain or poor reputation files on client computing devices 206 based on their metadata properties. In some embodiments, determining module 110 may utilize LSH with cosine similarity or HSNW with DBScan to provide scalable clustering. The clusters of files may then be described based on their dominant characteristics using root cause analysis (RCA) to identify their consistent metadata properties. Determining module 110 may then search for files matching a cluster's consistent metadata properties on other client computing devices to determine whether or not the properties uniquely identify files that appear in the cluster of client computing devices 206. The aforementioned description for identifying uncertain or poor reputation files may also be applied to the identification of uncertain or poor reputation domains, scripts, and/or any other computing device artifacts described herein.

At step 310 one or more of the systems described herein may perform a security action that protects against a potential malware attack. For example, security module 110 may, as part of server 202 in FIG. 2, perform a security action that protects against a potential malware attack on client computing devices 206 determined to contain suspicious artifacts 126 at step 308.

Security module 112 may perform a security action that protects against a potential malware attack in a variety of ways. In some examples, security module 112 may generate a potential malware attack action/notification for client computing devices 206. In one embodiment, security module 112 may add certain instances of suspicious artifacts 126 (e.g., files, domains, and/or URLs) to a blacklist to deny future access to these suspicious artifacts 126 by client computing devices 206. Additionally or alternatively, security module 112 may send other instances of suspicious artifacts 126 (e.g., scripts, registry load-point entries, and/or event logs) to a threat response team for the creation of behavioral threat detection signatures. Additionally or alternatively, security module 112 may generate a potential malware alert (for sending to threat protection application 212) for client computing devices 206. Additionally or alternatively, security module 112 may notify one or more financial institutions associated with client computing devices 206 of a potential malware attack.

FIG. 5 is a block diagram of an additional example system 500 for detecting malware based on anomalous cross-customer financial transactions. As shown in FIG. 5, system 500 may include customer financial transaction metadata 502, an anomaly detector 514, a threat detector 516, and customer threat protection account artifacts 518.

Customer financial transaction metadata 502, which may be associated with one or more customer financial institution accounts for conducting financial transactions, may include userIDs 504, account details 506, merchant details 508, transaction amounts 510, and timestamps 512. Customer threat protection account artifacts 516, which may include data on customer computing devices that is monitored by a threat protection application for protecting against malware, may include userIDs 520, device IDs 522, files 524, URLs, domains, and IP addresses 526, scripts 528, registry load-point entries 530, and event logs (e.g., WINDOWS operating system event logs) 532.

In some examples, anomaly detector 514 may be configured to utilize machine learning algorithms (e.g., Isolation Forests using AdaCost) to prioritize the detection of fraudulent transactions with high monetary value as well as transactions with properties known to be associated with fraud based on customer financial transaction metadata 502. Anomaly detector 514 may further be configured to utilize customer financial transaction metadata 502 to characterize multiple anomalous transactions occurring a predetermined period (e.g., 24 hours) of each other and identify large clusters of similar anomalies using LSH with cosine similarity or HSNW+DBScan. Anomaly detector 514 may further be configured to link customer accounts containing customer financial transaction metadata 502 to customer threat protection accounts containing customer threat protection artifacts 518 to identify device IDs 522 for input into threat detector 516.

In some examples, threat detector 516, upon receiving device IDs 522, may be configured to collect customer threat protection artifacts 518 and identify any identical or non-identical artifacts that are disproportionately likely to appear on a cluster of computing devices. In identifying non-identical artifacts, threat detector 516 may utilize artifact clustering to detect uncertain or poor reputation artifacts in a computing device cluster. In some examples, threat detector 516, in utilizing artifact clustering, may use LSH with cosine similarity or HSNW with DBScan to provide scalable and efficient clustering and further utilize aggregation techniques from root cause analysis to identify consistent metadata properties to match with metadata properties on other computing devices to determine whether or not the properties uniquely identify artifacts appearing in the cluster.

As explained in connection with method 300 above, the systems and methods described herein provide financial anomaly detector component and a threat hunter component for malware detection based on cross-customer financial transaction anomalies. The financial anomaly component may utilize a machine learning algorithm to detect financial anomalies (e.g., cryptocurrency transactions associated with ransomware payments and Banking Trojan activity) among groups of financial account customers experiencing similar financial losses from these anomalies. The financial anomaly component may then link the affected customer financial accounts with corresponding customer threat protection accounts to identify customer machine (i.e., computing device) identifiers for each customer and then input these customer machine identifiers into the threat hunter component. The threat hunter component may then be utilized to collect and identify artifacts utilized by threat actors (e.g., software files, visited domains, URLs, registry entries for load points, scripts, and event log patterns) that are disproportionately likely to appear on a cluster of the customer machines as compared to other machine clusters as potential malware. By utilizing the aforementioned anomaly and threat hunter components in this way, the systems and methods may identify and protect users from potentially harmful malware attack campaigns targeting customer financial accounts and further prevent or reduce financial losses resulting from these campaigns.

Figure 6:
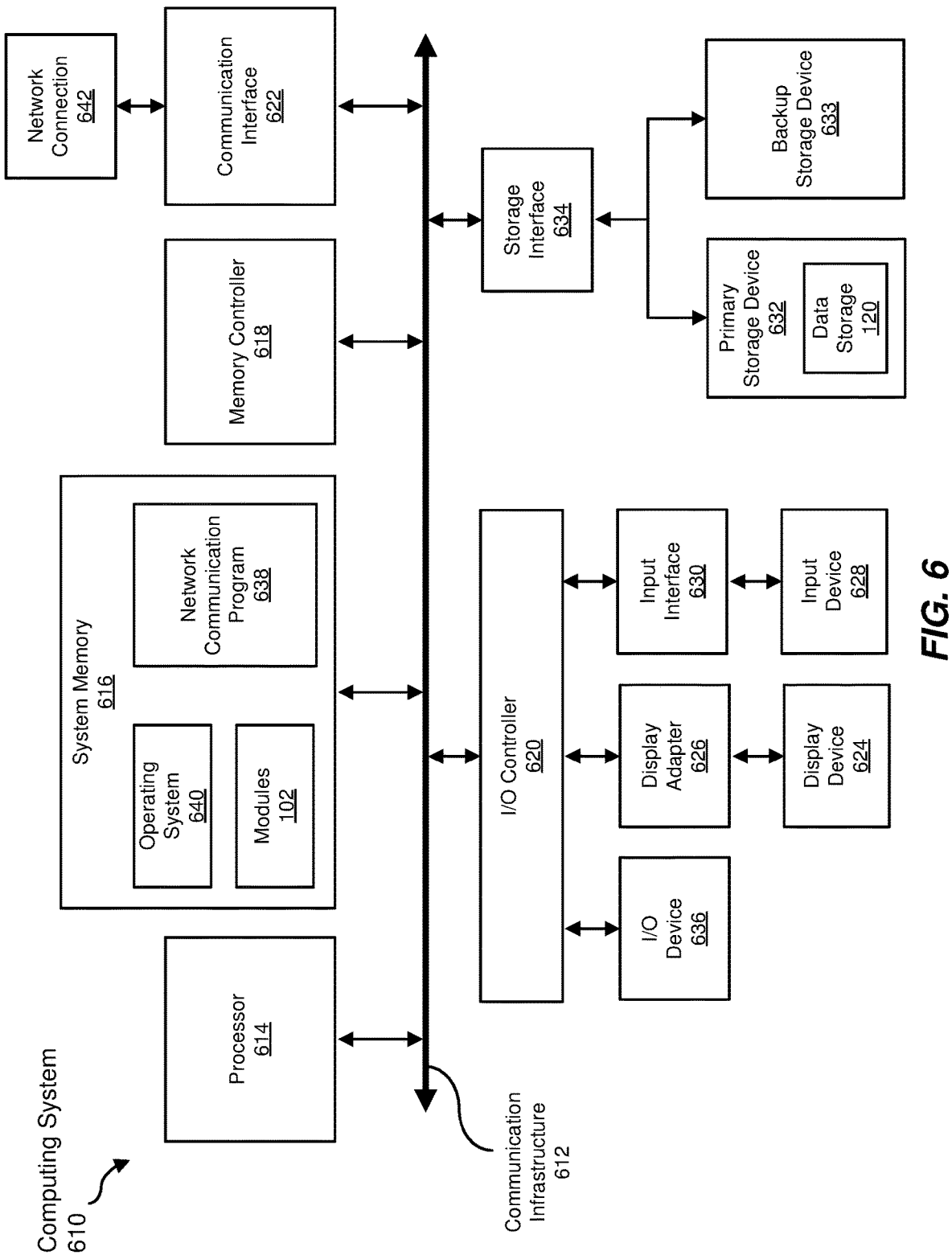
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120] from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
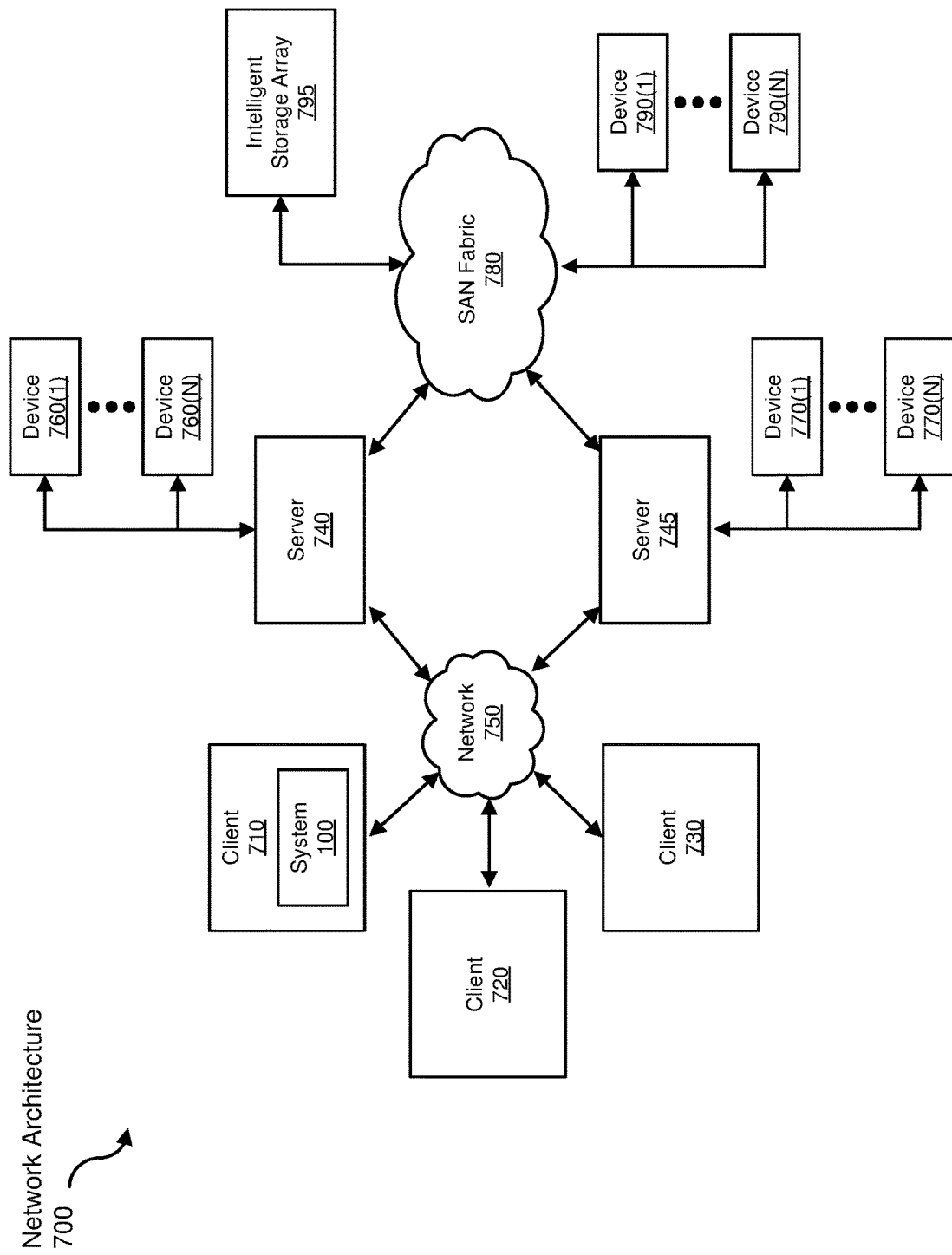
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting malware based on anomalous cross-customer financial transactions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malware based on anomalous cross-customer financial transactions, at least a portion of the method being performed by one or more computing devices comprising at least one processor, the method comprising:
   detecting, using a machine-learning algorithm executing on the one or more computing devices, a set of anomalies associated with fraudulent financial transactions for one or more source user accounts in a plurality of customer financial accounts;
   identifying, by the one or more computing devices and based on customer transaction metadata associated with a group of target user accounts in the customer financial accounts, a cluster of financial transactions having anomaly instances in common with the set of anomalies for the source user accounts;
   linking, by the one or more computing devices, each of the customer financial accounts having the common anomaly instances in the cluster of financial transactions with a corresponding customer threat protection account to discover a user device identification for the customer threat protection account;
   determining, by the one or more computing devices and utilizing the user device identification, that one or more artifacts appearing on a plurality of user devices are associated with a potential malware attack, wherein determining, utilizing the user device identification, that the one or more artifacts appearing on the plurality of user devices are associated with the potential malware attack comprises:
      collecting the artifacts from the user devices; and
      identifying suspicious artifact instances in the collected artifacts as being associated with the potential malware attack, the suspicious artifact instances comprising a set of identical artifact instances comprising at least one of visited domains, uniform resource locators, registry load-point entries, or event logs on each of the user devices having a disproportionate likelihood of appearing on infected computing devices as compared to other computing devices; and
   performing, by the one or more computing devices, a security action that protects against the potential malware attack.

2. The computer-implemented method of claim 1, wherein detecting the set of anomalies associated with fraudulent financial transactions comprises:
   monitoring, utilizing an unsupervised anomaly detection algorithm, one or more financial transactions involving the source user accounts; and
   identifying one more or more attributes associated with financial fraud in the financial transactions involving the source user accounts as the set of anomalies associated with fraudulent financial transactions.

3. The computer-implemented method of claim 2, wherein the attributes associated with financial fraud comprise at least one of:
   a monetary value associated with the financial transactions involving the source user accounts; and
   a financial asset type associated with known fraudulent financial transactions.

4. The computer-implemented method of claim 1, wherein identifying, based on customer transaction metadata, the cluster of financial transactions having anomaly instances in common with the set of anomalies for the source user accounts comprises:

examining the customer transaction metadata to characterize any anomalies in financial transactions associated with the group of target user accounts occurring within a predetermined time period; and using an approximate nearest neighbor search algorithm to identify, from among the anomalies in the financial transactions associated with the target user accounts, the anomaly instances in common with the set of anomalies for the source user accounts.

5. The computer-implemented method of claim 4, wherein the customer transaction metadata comprises at least one of:
a customer user identification;
customer account data;
merchant data;
transaction amount data; and
timestamp data.

6. The computer-implemented method of claim 4, wherein the approximate nearest neighbor search algorithm comprises at least one of:
a locality sensitive hashing (LSH) algorithm; or
a hierarchical navigable small worlds (HSNW) algorithm.

7. The computer-implemented method of claim 1, wherein identifying the suspicious artifact instances in the collected artifacts further comprises:
identifying non-identical artifact instances on each of the user devices.

8. The computer-implemented method of claim 1, wherein identifying the identical artifact instances further comprises identifying at least one of:
files; and
scripts.

9. The computer-implemented method of claim 7, wherein identifying the non-identical artifact instances comprises identifying a cluster of similar artifact instances, wherein the similar artifact instances include at least one of:
similar files;
similar visited domains;
similar URLs;
similar registry load-point entries;
similar scripts; and
similar event logs.

10. The computer-implemented method of claim 1, wherein performing the security action that protects against the potential malware attack comprises at least one of:
adding the artifacts associated with the potential malware attack to a blacklist;
generating an alert for the user devices associated with the potential malware attack; and
notifying a financial institution associated with the user devices of the potential malware attack.

11. A system for detecting malware based on anomalous cross-customer financial transactions, the system comprising:
at least one physical processor;
physical memory comprising computer-executable instructions and one or more modules that, when executed by the physical processor, cause the physical processor to:
detect by a detection module using a machine-learning algorithm, a set of anomalies associated with fraudulent financial transactions for one or more source user accounts in a plurality of customer financial accounts;
identify, by an identification module, based on customer transaction metadata associated with a group of target user accounts in the customer financial accounts, a cluster of financial transactions having anomaly instances in common with the set of anomalies for the source user accounts;
link, by a linking module, each of the customer financial accounts having the common anomaly instances in the cluster of financial transactions with a corresponding customer threat protection account to discover a user device identification for the customer threat protection account;
determine, by a determining module utilizing the user device identification, that one or more artifacts appearing on a plurality of user devices are associated with a potential malware attack, wherein the determining module determines, utilizing the user device identification, that the one or more artifacts appearing on the plurality of user devices are associated with the potential malware attack by:
collecting the artifacts from the user devices; and
identifying suspicious artifact instances in the collected artifacts as being associated with the potential malware attack, the suspicious artifact instances comprising a set of identical artifact instances comprising at least one of visited domains, uniform resource locators, registry load-point entries, or event logs on each of the user devices having a disproportionate likelihood of appearing on infected computing devices as compared to other computing devices; and
perform, by a security module, a security action that protects against the potential malware attack.

12. The system of claim 11, wherein the detection module detects the set of anomalies associated with fraudulent financial transactions by:
monitoring, utilizing an unsupervised anomaly detection algorithm, one or more financial transactions involving the source user accounts; and
identifying one more or more attributes associated with financial fraud in the financial transactions involving the source user accounts as the set of anomalies associated with fraudulent financial transactions.

13. The system of claim 12, wherein the attributes associated with financial fraud comprise at least one of:
a monetary value associated with the financial transactions involving the source user accounts; and
a financial asset type associated with known fraudulent financial transactions.

14. The system of claim 11, wherein the identification module identifies, based on customer transaction metadata, the cluster of financial transactions having anomaly instances in common with the set of anomalies for the source user accounts by:
examining the customer transaction metadata to characterize any anomalies in financial transactions associated with the group of target user accounts occurring within a predetermined time period; and
using an approximate nearest neighbor search algorithm to identify, from among the anomalies in the financial transactions associated with the target user accounts, the anomaly instances in common with the set of anomalies for the source user accounts.

15. The system of claim 14, wherein the customer transaction metadata comprises at least one of:
a customer user identification;
customer account data;
merchant data;
transaction amount data; and
timestamp data.

16. The system of claim 14, wherein the approximate nearest neighbor search algorithm comprises at least one of a locality sensitive hashing (LSH) algorithm and a hierarchical navigable small worlds (HSNW) algorithm.

17. The system of claim 11, wherein the security module performs the security action by:
- adding the artifacts associated with the potential malware attack to a blacklist;
- generating an alert for the user devices associated with the potential malware attack; or
- notifying a financial institution associated with the user devices of the potential malware attack.

18. A non-transitory computer-readable medium comprising one or more computer-executable instructions that, when executed by at least one processor of a computing device, cause the computing device to:
- detect, using a machine-learning algorithm executing on the computing device, a set of anomalies associated with fraudulent financial transactions for one or more source user accounts in a plurality of customer financial accounts;
- identify, based on customer transaction metadata associated with a group of target user accounts in the customer financial accounts, a cluster of financial transactions having anomaly instances in common with the set of anomalies for the source user accounts;
- link each of the customer financial accounts having the common anomaly instances in the cluster of financial transactions with a corresponding customer threat protection account to discover a user device identification for the customer threat protection account;
- determine, utilizing the user device identification, that one or more artifacts appearing on a plurality of user devices are associated with a potential malware attack, wherein, utilizing the user device identification, the determination that the one or more artifacts appearing on the plurality of user devices are associated with the potential malware attack comprises:
- collecting the artifacts from the user devices; and
- identifying suspicious artifact instances in the collected artifacts as being associated with the potential malware attack, the suspicious artifact instances comprising a set of identical artifact instances comprising at least one of visited domains, uniform resource locators, registry load-point entries, or event logs on each of the user devices having a disproportionate likelihood of appearing on infected computing devices as compared to other computing devices; and
- perform a security action that protects against the potential malware attack.

19. The system of claim 11, wherein the determining module further identifies the suspicious artifact instances in the collected artifacts by identifying non-identical artifact instances on each of the user devices.

20. The system of claim 11, wherein the identical artifact instances further comprise at least one of:
- files; and
- scripts.

\* \* \* \* \*